(No Model.) 2 Sheets—Sheet 1.
F. W. SKINNER.
ACTUATING MECHANISM FOR FLUID METERS.
No. 498,314. Patented May 30, 1893.
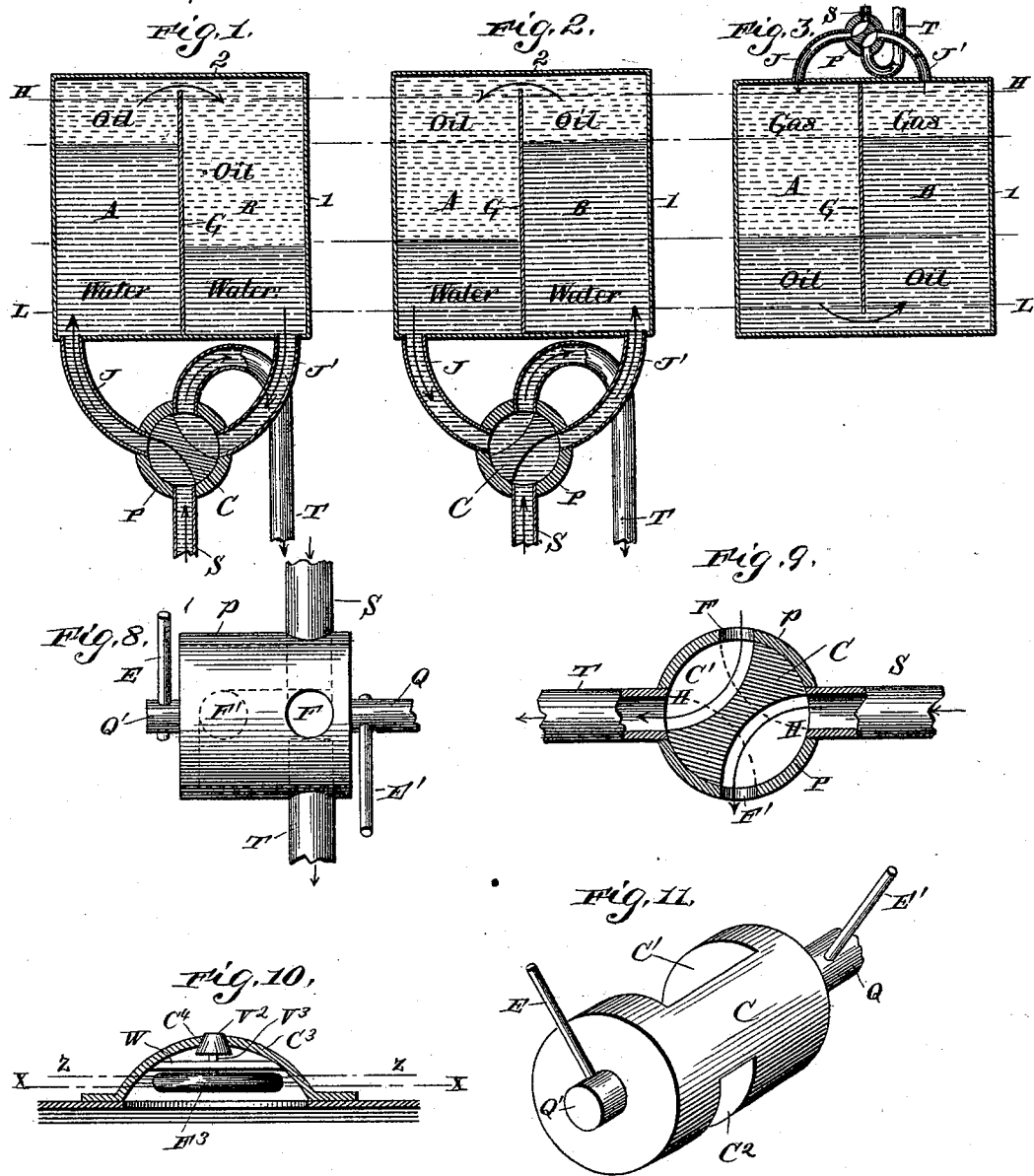

(No Model.) 2 Sheets—Sheet 2.
F. W. SKINNER.
ACTUATING MECHANISM FOR FLUID METERS.
No. 498,314. Patented May 30, 1893.
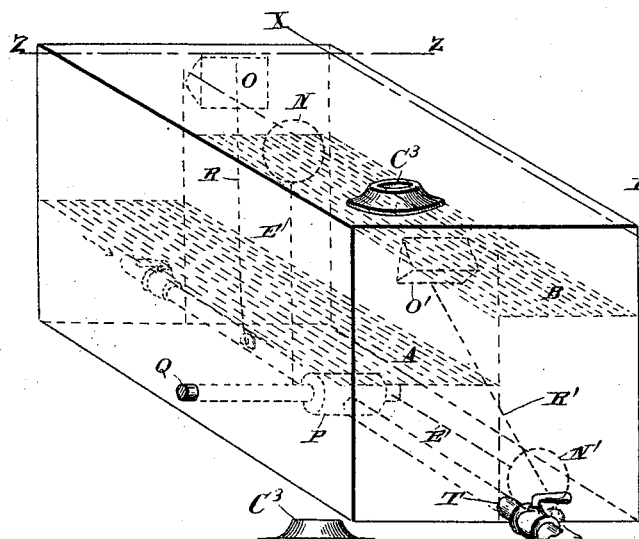
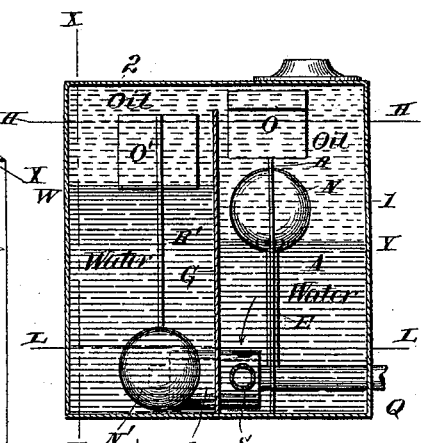
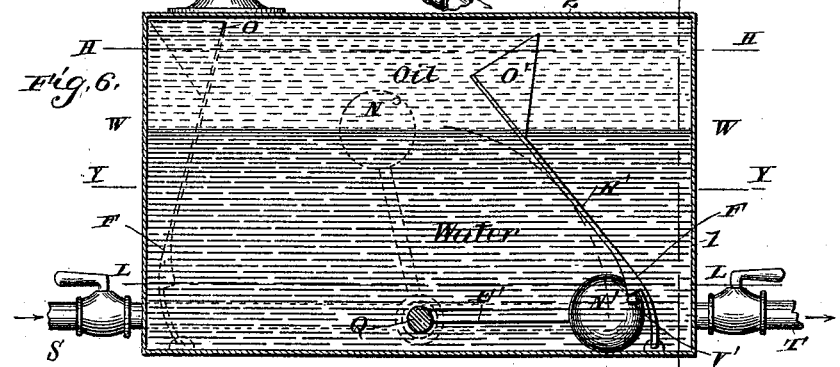
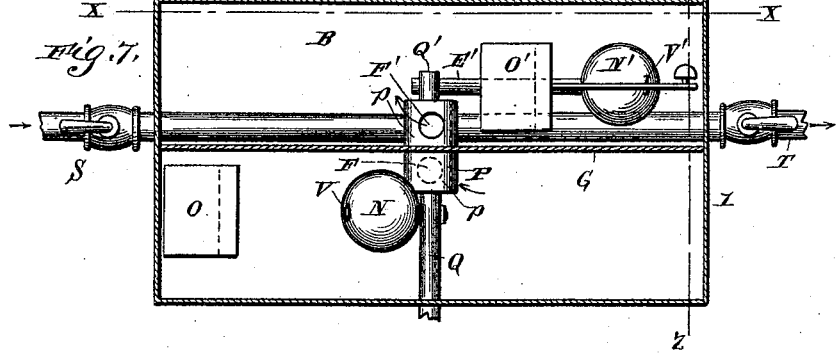
Witnesses:
Bernard J. Iacke
M. E. Finley.
Inventor:
Frank W. Skinner.
by D. Walter Brown,
his attorney.

UNITED STATES PATENT OFFICE.

FRANK W. SKINNER, OF NEW YORK, N. Y.

ACTUATING MECHANISM FOR FLUID-METERS.

SPECIFICATION forming part of Letters Patent No. 498,314, dated May 30, 1893.

Application filed April 4, 1891. Serial No. 387,703. (No model.)

*To all whom it may concern:*

Be it known that I, FRANK W. SKINNER, a citizen of the United States, and a resident of New York, in the county of New York and State of New York, have invented certain new and useful Improvements in Apparatus for Transmitting and Registering Fluid-Pressures and Measuring Fluids, of which the following is a specification.

My invention relates to improvements in apparatus for transmitting and registering fluid pressures, and also for measuring fluids, and, particularly, my invention relates to improvements in fluid meters.

The object of my improvement is to dispense with the solid moving parts, such as plungers, wheels, cylinders, and other solid moving parts which have hitherto been used in fluid meters, and to substitute for such solid moving parts a pressure-transmitting fluid, which is contained in compartments in the vessel or meter, and by the agency of which fluid the head or pressure of the fluid entering the meter is transmitted to and exerted upon the fluid which is discharged from the meter, and, as a consequence, no matter what the variations of head may be, the discharge is always taking place at the same pressure that the fluid entering the meter is exerting on the pressure transmitting fluid. By the use of the pressure transmitting fluid, I dispense with all solid moving parts, which interpose any resistance, by their friction or otherwise to the flow of the measured fluid through the meter. In existing meters this resistance involves perceptible and very undesirable loss of head, but with my device there is no appreciable loss of head, the fluid issuing from the meter under the same head or pressure as it enters the meter. This principle of pressure transmission by the agency of a contained fluid, is applied in my invention in the following manner: The pressure transmitter (or the meter) is divided on the interior into connecting compartments. When the apparatus is to be used as a meter the said compartments should be of equal volume, each to each, otherwise the volumes of the said compartments may be unequal. These compartments contain a known quantity of a pressure transmitting fluid, to wit: a little more than is sufficient to fill one of said compartments, which fluid must be of a different specific gravity from the fluid whose pressure is to be transmitted, (or which is to be measured.) One of said compartments of the pressure transmitter (or meter) is connected with a supply, and the other compartment is connected with a discharge pipe. Now it is evident that, supposing a fluid to be entering the pressure transmitter, (or meter) through the supply pipe, and to be discharging through the discharge pipe, that the pressure with which the fluid enters the meter will be transmitted by the pressure transmitting fluid in the meter to the discharging fluid in the other compartment, and that the discharge will always be taking place under a head equal to the pressure of the incoming fluid. This then, broadly considered, is my invention, viz: a pressure transmitter, consisting of a closed vessel divided into connected compartments, which contain a pressure transmitting fluid of different specific gravity from the fluid whose pressure is to be transmitted, and said compartments being connected with supply and discharge pipes. In order to secure continuous action I combine with the pressure transmitting device just described means for alternating the supply and discharge of fluid into and from the several said compartments, and my invention consists, therefore, in the second place, in the combination with the pressure transmitter (or meter) of means for alternating the supply and discharge.

Referring now to the drawings which accompany the specification to aid in the description: Figures 1 and 2, are diagrammatic representations of the application of my principle, in the case when the pressure transmitting fluid is of less specific gravity than the fluid whose pressure is to be transmitted, or which is to be measured. Fig. 3, is a diagrammatic representation of the application of my principle, when the pressure transmitting fluid is of greater specific gravity than the fluid whose pressure is to be transmitted, or which is to be measured. Fig. 4, is an isometrical perspective of a meter organized for continuous operation. Fig. 5, is a vertical cross section of the meter on the line Z—Z of Fig. 4. Fig. 6, is a longitudinal section of the meter on the line X—X of Fig. 4. Fig. 7, is a plan view of the meter, from above the top being removed to show the interior. Fig. 8, is an enlarged elevation, and Fig. 9, is an enlarged section of the alternating valve. Fig. 10, is an enlarged section of an air valve, sometimes necessary to permit escape of air from the meter. Fig. 11 is an enlarged view of the plug of the valve shown in Figs. 8 and 9.

My pressure transmitter (or meter) consists of a closed case or vessel, 1, which is preferably constructed of metal, and of any suitable shape. Said vessel, 1, is interiorly divided into two compartments, A and B, by means of the partition, G. Said partition, G, in Figs. 1 and 2 extends entirely across from side to side of the case, 1, but does not extend quite up to the top of said case, 1, so that there is left a certain open space over said partition, G, communicating between the aforesaid compartments, A and B. Of course the partition, G, might be carried full up to the top of the case, 1, and a good sized hole might be made through said partition, G, to establish communication between chambers A and B. As a convenient method of construction, I prefer to cast said case, 1, with sides, bottom and partition, G, integral, and to form the top, 2, separately, and then to bolt or otherwise secure the top, 2, by air tight joint on the case, 1. Each of said compartments A and B contains a pressure transmitting fluid, which is of different specific gravity than the fluid whose pressure is to be transmitted.

In Figs. 1, 2 and 3 the pressure transmitting fluid is represented as oil, and in Figs. 1 and 2 the fluid whose pressure is to be transmitted is represented as water, but, in Fig. 3 as gas, in the one case the fluid whose pressure is transmitted being heavier, in the other lighter than the oil. Now supposing the chamber A to be connected at the bottom with a pipe, J, and the chamber, B, to be connected at the bottom with pipe, J', it is evident that the head or pressure of the water entering vessel, 1, by the pipe J, will be communicated to the oil in chamber, A, and by the oil in said chamber, A, through or over partition, G, to the oil in chamber, B, and thence to the water which is being discharged through pipe, J'; and if we suppose chamber, B, to have been originally filled up to a designed level, H, H, with water, then it is evident that a known volume of water will have been discharged from chamber B, (when the water has fallen in said chamber to the level L, L, (Figs. 1, 2, 3) and always at the pressure of the incoming water. But without some means of alternating the supply and discharge, when the chamber B has once emptied, that would be the end of the operation. Now, suppose, the said pipes J, and J', are connected with a valve P, said valve P also being connected with a main supply pipe S, and main discharge pipe, T, said valve P being so arranged, as shown in Figs. 1 and 2, that the pipes J and J' may each be put into connection with either supply pipe S or discharge pipe T. Let pipe J be first connected with supply pipe S, pipe J' being first connected with discharge pipe T. Then supposing chamber B to be full to the line, H, H, water will enter chamber A, its head or pressure being transmitted by the oil to the water in chamber B, which will be discharged under that head or pressure. The two compartments A and B being assumed to be of equal capacity, when the water in B has fallen to the level L, L, a little above the mouths of pipes J J', the water in A will have reached the level H, H, a little below the top of partition G, the oil in the meantime having been forced from chamber A to chamber B. Now suppose that at the instant when the water in A has ascended to the level H, H, and the water in B has descended to the level L, L, the valve P is shifted to the position of Fig. 2; then water will be admitted to chamber B, and discharged from chamber A, when by again shifting valve P back to the position of Fig. 1, the supply and discharge will be again reversed, and so on, as often as the valve P is shifted.

In Fig. 3, the fluid to be measured is represented as gas which is lighter than the oil in the vessel 1. In this case the pipes J, J', will connect with the top of the vessel 1, and the oil will be beneath the gas. In other respects the arrangement and operation will be the same as was described in connection with Figs. 1 and 2.

In Figs. 4, 5, 6 and 7, is shown a meter completely organized for automatic operation. The case, 1, is constructed in the same manner as hereinbefore described, and with the partition, G, dividing the interior into two preferably equal and communicating compartments A, B. In these said figures the pressure transmitting fluid is assumed to be of less specific gravity than the fluid to be measured, and so the partition, G, is represented as not extending quite to the top, 2, of vessel 1, but as leaving an open space for communication between chambers A and B over the top of partition, G. In the lower part of the vessel, 1, is placed the alternating valve, P, with its length crossing through the partition, G, so that one part of said valve is in each of said compartments A and B. Said valve P is very efficiently constructed of a sleeve, $p$, fixed to the vessel, 1, and connecting with the main supply pipe S, and main discharge pipe, T, and said sleeve, $p$, also has a port, F, communicating with compartment A, and a port F' communicating with compartment B; and extending through said sleeve, $p$, with working fit is a valve plug, C, which has ports, C', and, C², of the form shown in Fig. 11. Said ports C', C², are so placed that according to the position of the valve plug, C, the ports F, and F', may each be placed in communication either with the supply pipe S, or with the discharge pipe, T. At each of its ends the said valve plug, C, has an axial spindle, Q, and Q' the end of said spindles Q projecting with tight working fit through the case, 1, so that it may actuate recording mechanism; and to these spindles, Q, Q', are fixed stiff arms, E, E', placed at such an angle with each other that when one arm E is in a substantially vertical position the other arm will be horizontal. (See Fig. 6.) On the extremities of these said arms, E, E', are floats, N, N', of a specific gravity greater than the pressure transmitting fluid (oil) but less than the fluid to be measured, (water;) and the said arms E, E', are of such length that when the floats N, or N', have risen to the top of the water in the several compartments, A, B, said arms E, or E', will be nearly vertical. (See Figs. 4 and 6.) Adjacent to the floats, N, N', when either of said floats is in the lowest position near the bottom of the vessel, 1, are stiff rods, R, R', which are pivoted at their lower extremities to the bottom of the vessel, 1. Said rods, R, R', have floats, O, O', at their upper ends, said floats, O, O', being of greater specific gravity than the pressure transmitting fluid (oil) but of lesser specific gravity than the fluid to be measured, (water,) and said rods, R, R', each have a hook, F, or F', so placed as to engage over pins, V, V', on the floats, N, N', and the rods, R, R', are preferably so curved that the floats, O, O', tend to fall over said floats N, N'; (see Figs. 4 and 6.,) and said rods, R, R', are of such length and curvature that when the floats O, O', are at their highest position, the hooks, F, F', will have drawn completely clear of the pins, V, V', on the floats N, N'. Said floats N, N', and O, O', may be of any suitable ordinary construction as light copper balls, or prisms.

The operation is as follows: Suppose the valve plug, C, to be so turned that its ports, C', C², are admitting water into chamber, B, from pipe S, and are discharging water from chamber A through pipe T, (Figs. 5 and 9) and that compartment, A, is at the beginning full of water up to the level, H, H, and that the water in chamber B, is at the same instant at the level, L, L, the float N in compartment A being at its highest and the float N' in compartment, B, being at its lowest level, and held down by the hook on rod R', engaging over the pin V' on said float N'. Now, as said, water is entering compartment B, thereby pressing on the oil in B, with a pressure equal to that with which it enters compartment B, the oil will transmit this pressure to the water in A, which will therefore be discharged under that pressure. Now the water in B rising and displacing the oil over into A at length the water in B rises to H, H, the water in A having fallen to L, L. While water in B was so rising the float N' also tended to rise, but could not because it was held down by hook F'. But while water in B was rising the float O' was also rising, and when the water in B has risen to H, H, the float O' will have carried the hook F' clear of the pin V', and the float N' will immediately rise with the accumulated force due to its depth below the level H, H. At the same time the float O, in chamber A will tend to drop and these two forces will very quickly and energetically revolve valve plug C to the position indicated by the dotted lines in Fig. 9, where the compartment B will be connected with discharge pipe T, and compartment A will be connected with supply pipe S. Then chamber A will be emptied in the manner just described, and thus as each chamber is filled to level, H, H, and the other emptied to level, L, L, the valve plug, C, will be shifted, reversing the supply and discharge in the manner described.

Since experience indicates that there is a tendency of air to separate from water and collect in closed vessels, I provide means for removing the air as follows: At the top of the meter, I form a little upwardly convex chamber, C³, in the top of which is a vent opening, C⁴, closed by a ground valve, V². Said valve V², has a stem V³, which is guided by passing through a guide rib, W, and said stem, V³, has at its lower extremity a float, F³. The operation is as follows: When no air is in the vessel, 1, oil (if oil be used) will fill the vessel, 1, and chamber C³, above the float, F³, and will force the valve V², home to its seat, thereby closing the vent opening C⁴. But if air accumulates in vessel, 1, it will collect in the highest part, which is the chamber, C³, and will displace oil from around the float, F³. Thereupon said float F³, will fall opening valve V². The air will then escape, and the oil will again cause valve V², to close, and so on.

The drawings show oil as the pressure transmitting fluid in case, 1, but any other fluid may be used, provided it is of different specific gravity than the fluid whose pressure is to be transmitted, or volume measured, and provided it will not mix with said second fluid. Thus with meters for water, air can be used as the pressure transmitting fluid; it being evident that the pressure of the water in the supply pipe will be transmitted by the air to the water in the discharge pipe.

I claim—

1. A device for transmitting fluid pressures, consisting of a stationary closed vessel having communicating compartments which contain a pressure transmitting fluid, and each of said compartments alternately communicating with a pressure transmitting conduit and with a pressure receiving conduit, which said conduits contain a fluid of different specific gravity from the fluid in said compartments.

2. A device for transmitting fluid pressures, consisting of a closed vessel having communicating compartments which contain a pressure transmitting fluid, and each of said compartments communicating alternately with a pressure transmitting conduit and with a pressure receiving conduit which contain a fluid of different specific gravity from the fluid in said compartments, and a float or floats operated by the rise and fall of the fluid which enters said compartments from said pressure transmitting conduit to effect said alternation.

3. A device for transmitting fluid pressures consisting of a stationary closed vessel having communicating compartments which contain a pressure transmitting fluid, and each of said compartments alternately communicating with a pressure transmitting conduit and a pressure receiving conduit which contain a fluid of different specific gravity from the fluid in said compartments, and a device operated by the rise and fall of the fluid in said compartments to effect said alternation.

4. A fluid meter consisting of a stationary closed vessel having communicating compartments which contain a pressure transmitting fluid, and each of said compartments alternately communicating with a supply and with a discharge pipe, and a device for effecting said alternation.

5. A fluid meter consisting of a stationary closed vessel having communicating compartments which contain a pressure transmitting fluid, and each of said compartments communicating alternately with a supply and a discharge pipe, and a device operated by the rise and fall of fluid in said compartments for effecting said alternation.

6. In a fluid meter, an alternating valve consisting of a sleeve, which is in communication with supply and discharge pipes, and also with the compartments of the meter, and a plug in said sleeve, having ports in communication with said supply and discharge pipes, and a device, or devices operated by the rise and fall of liquid in the meter for shifting the plug or the sleeve and establishing communication alternately between said supply and discharge pipes and one and the other of said compartments of the meter, as described.

7. In a meter, an alternating valve consisting of a sleeve which is in communication with supply and discharge pipes, and also with the compartments of the meter, a plug in said sleeve having ports in communication with said supply and discharge pipes, floats connected with said plug by levers, and other floats adapted to engage with or release the first named floats, according to the level of the measured fluid in the compartments of the meter, as described.

8. In a meter, an alternating valve consisting of a sleeve which is in communication with supply and discharge pipes and also with the compartments of the meter, a plug in said sleeve having a port which is always in communication with one compartment of the meter and alternately with the supply and the discharge pipe, and also another port which is always in communication with the other compartment of the meter and alternately in communication with said supply and discharge pipes, and floats operated by the rise and fall of the fluid in the meter connected with said plug, for the purpose of reciprocating the same.

Signed at New York, in the county of New York and State of New York, this 23d day of March, A. D. 1891.

FRANK W. SKINNER.

Witnesses:
JOHN C. WALL,
LOUIS M. FULTON.